(12) United States Patent
Serizawa et al.

(10) Patent No.: US 8,368,986 B2
(45) Date of Patent: Feb. 5, 2013

(54) OPTICAL SCANNING DEVICE AND IMAGE FORMING APPARATUS

(75) Inventors: Keiichi Serizawa, Tokyo (JP); Takeshi Yamakawa, Tokyo (JP); Kazunori Watanabe, Tokyo (JP); Hiroshi Johno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 192 days.

(21) Appl. No.: 12/929,564

(22) Filed: Feb. 1, 2011

(65) Prior Publication Data

US 2011/0199664 A1 Aug. 18, 2011

(30) Foreign Application Priority Data

Feb. 17, 2010 (JP) .................................. 2010-032361

(51) Int. Cl.
*G02B 26/08* (2006.01)
(52) U.S. Cl. .................................................... 359/216.1
(58) Field of Classification Search ............... 359/196.1, 359/198.1, 206.1–207.6, 216.1–219.1; 347/242–245, 347/257–261; 358/484
See application file for complete search history.

(56) References Cited

U.S. PATENT DOCUMENTS

| | | | |
|---|---|---|---|
| 7,443,556 B2 | 10/2008 | Serizawa | |
| 7,782,501 B2 | 8/2010 | Serizawa | |
| 2006/0209375 A1 | 9/2006 | Serizawa | |
| 2007/0098460 A1 | 5/2007 | Serizawa | |
| 2007/0216966 A1* | 9/2007 | Ohsugi | 358/484 |
| 2009/0009836 A1 | 1/2009 | Narita et al. | |
| 2009/0244670 A1 | 10/2009 | Sato et al. | |
| 2010/0033787 A1 | 2/2010 | Serizawa et al. | |

FOREIGN PATENT DOCUMENTS

| | | |
|---|---|---|
| JP | 2004-333844 | 11/2004 |
| JP | 2006259408 A | 9/2006 |
| JP | 2007203708 A | 8/2007 |
| JP | 2009-198890 | 3/2009 |
| JP | 4299946 B2 | 4/2009 |
| JP | 4350567 B2 | 7/2009 |
| JP | 2009198888 A | 9/2009 |

OTHER PUBLICATIONS

European Search Report dated Apr. 28, 2011 issued in corresponding European Application No. 11153250.3.
Abstract of JP 2001-264666 published on Sep. 26, 2001.
Abstract of JP 2005-262596 published on Sep. 29, 2005.

* cited by examiner

Primary Examiner — Euncha Cherry
(74) Attorney, Agent, or Firm — Harness, Dickey & Pierce, P.L.C.

(57) ABSTRACT

An optical scanning device includes: a light source; a polygon scanner that deflects a light beam output from the light source; and various types of optical elements for focusing the light beam deflected by the polygon scanner onto a desired position on a surface to be scanned, wherein a hole or a thin-walled portion that is provided on an arrangement surface of an optical housing on which the polygon scanner and an optical element having power in a sub-scanning direction are arranged, wherein the hole or a thin-walled portion extends along a main-scanning direction, and is provided near to the optical element having power in the sub-scanning direction between the polygon scanner and the optical element having power in the sub-scanning direction.

10 Claims, 16 Drawing Sheets

(OPTICAL PATH A SIDE)

(OPTICAL PATH B SIDE)

(OPTICAL PATH A SIDE)

(OPTICAL PATH B SIDE)

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-032361 filed in Japan on Feb. 17, 2010.

BACKGROUND OF THE INVENTION

1. Field of the Invention

The present invention relates to an optical scanning device, and an image forming apparatus on which a polygon scanner and an optical element are installed.

2. Description of the Related Art

In an optical scanning device that performs optical writing onto a photosensitive element (image carrier) of an image forming apparatus, a light beam is deviated from an optical axis due to ambient temperature change over time. Therefore, an irradiation position of the light beam onto a surface to be scanned on the photosensitive element is changed. This causes image defects such as color shift in a tandem color machine or the like in some cases. In order to solve the problem, various scanning line adjusting units and configurations of an optical housing that is hard to be affected by thermal deformation have been conventionally proposed.

However, a known optical scanning device including a scanning line adjusting unit requires an adjustment mechanism for automatically adjusting a scanning line when color shift occurs over time as described in Japanese Patent Application Laid-open No. 2006-259408, for example. Such automatic adjustment is performed as follows. An adjustment trigger is provided during continuous printing; and an adjustment time for automatically adjusting a scanning line under predetermined conditions is set. Furthermore, a color shift amount is measured at this time so that color matching is performed by the scanning line adjusting unit. Accordingly, the automatic adjustment has significant disadvantages in that a waiting time required for a user increases or toner is used in the control for measuring a color shift amount, for example.

In addition, Japanese Patent Application Laid-open No. 2009-198888 discloses an optical scanning device having the following configuration in order to reduce color shift or color unevenness caused by distortion of an optical housing due to ambient temperature change over time. In the optical scanning device disclosed in Japanese Patent Application Laid-open No. 2009-198888, holes (openings) are provided at bases of ribs, the ribs being provided in a standing manner so as to be opposed to each other around a polygon scanner serving as a heat source arranged inside of the optical housing.

However, the configuration of a resin molded article such as an optical housing is complicated, and therefore, a thermal deformation state of such article has a complicated deformation mode in most cases. Therefore, simply providing holes around ribs that are opposed to each other near the polygon scanner can reduce a thermal deformation amount of the optical housing, but may adversely affect attachment postures of various optical elements such as lenses. Therefore, the problem of defective images generated over time, such as a color-shifted image, remains unsolved.

An object of the invention is to solve the problem that image defects occur due to temperature change over time in some cases in the conventional optical housings and is to provide an optical housing, an optical scanning device, and an image forming apparatus that can suppress the occurrence of defective images such as color-shifted images due to temperature change over time without using a scanning line adjusting unit.

SUMMARY OF THE INVENTION

It is an object of the present invention to at least partially solve the problems in the conventional technology.

According to an aspect of the present invention, there is provided an optical scanning device including: a light source; a polygon scanner that deflects a light beam output from the light source; and various types of optical elements for focusing the light beam deflected by the polygon scanner onto a desired position on a surface to be scanned, wherein a hole or a thin-walled portion that is provided on an arrangement surface of an optical housing on which the polygon scanner and an optical element having power in a sub-scanning direction are arranged, wherein the hole or a thin-walled portion extends along a main-scanning direction, and is provided near to the optical element having power in the sub-scanning direction between the polygon scanner and the optical element having power in the sub-scanning direction.

According to another aspect of the present invention, there is provided an image forming apparatus comprising the optical scanning device according to the optical scanning device mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the invention are described with reference to drawings.

Figure 1:
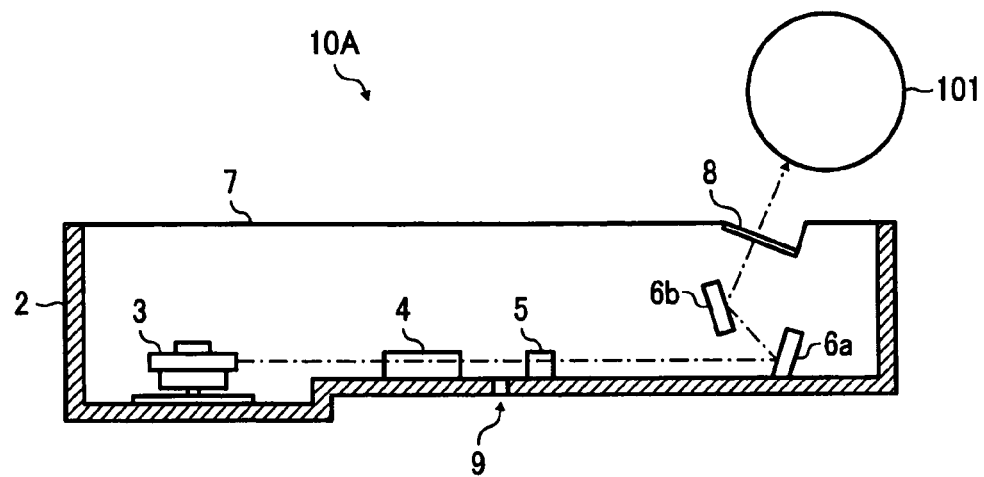
FIG. 1 is a cross-sectional configuration view illustrating an optical scanning device according to a first embodiment of the invention.
Figure 2:
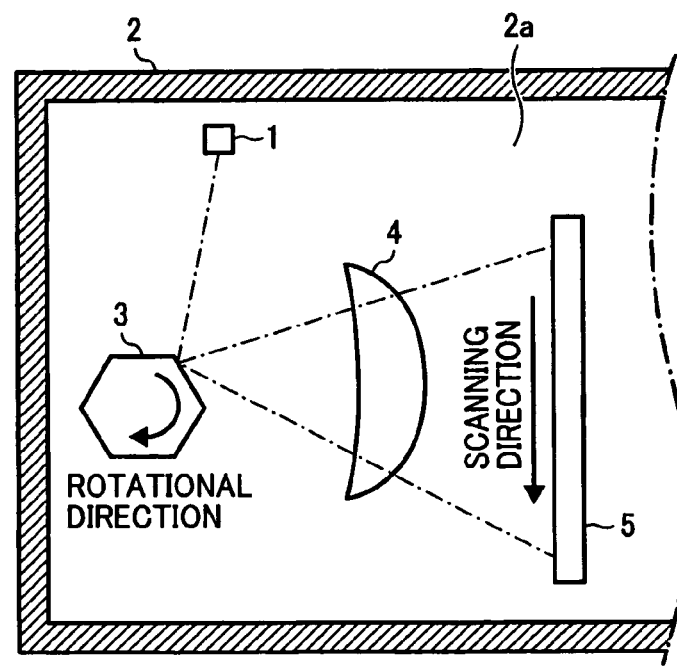
FIG. 2 is a plan view illustrating a main part of the optical scanning device according to the first embodiment of the invention.

FIG. 1 is a cross-sectional configuration view illustrating an example of an optical scanning device according to the invention. In FIG. 1, the optical scanning device is illustrated together with a photosensitive element (image carrier) 101 of an image forming apparatus. In FIG. 1, this optical scanning device 10A includes optical elements such as a polygon scanner 3, an fθ lens 4, a face tangle error correction lens 5, and mirrors 6 (6a and 6b) that are accommodated in an optical housing 2 as a housing of the optical scanning device 10A. The optical housing 2 is sealed with an upper cover 7 and a dustproof glass 8 is fitted into the upper cover 7, so that scanning light can be output therethrough. As illustrated in FIG. 2, a laser beam output from a light source 1 is reflected by a rotary polygon mirror of the polygon scanner 3 so as to pass through the fθ lens 4 and the face tangle error correction lens 5. Then, the laser beam scans a photosensitive element 101 via reflected through the mirrors 6a and 6b (FIG. 1).

The light source 1 is a light source that outputs a laser beam as scanning light. As the light source 1, an LD unit can be used, for example. The polygon scanner 3 has reflecting mirrors on side faces of a regular polygon and is rotated at high speed by a motor (not shown) so as to deflect the laser beam output from the light source 1 for scanning. The fθ lens 4 is an optical element that changes the scanning beam reflected by the polygon scanner from uniform angular motion to uniform linear motion. The face tangle error correction lens 5 is an optical element that corrects a face tangle error and the like of the polygon scanner and has a function of correcting the position of a scanning line in the sub-scanning direction (has power in the sub-scanning direction). The mirrors 6 are optical elements that guide a laser beam to the photosensitive element as a target to be scanned. The dustproof glass 8 prevents dusts and the like from being dropped off into the optical housing through an opening for scanning.

Figure 3:
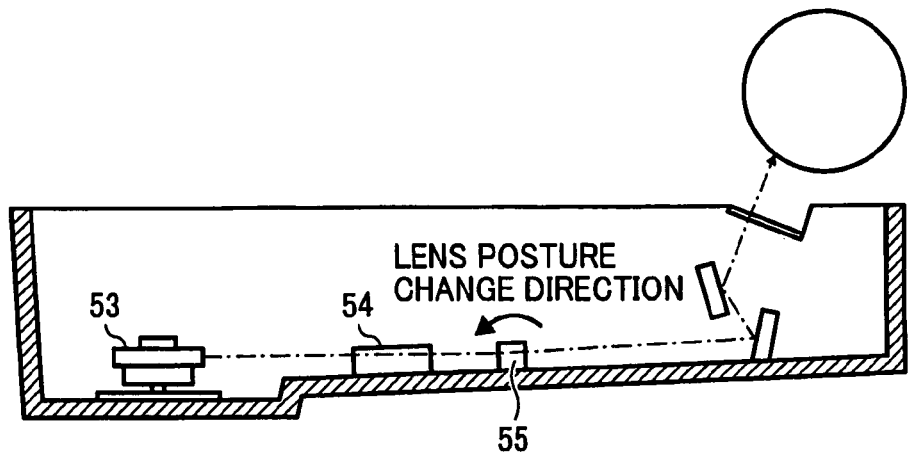
FIG. 3 is a cross-sectional view illustrating an example of a conventional optical scanning device.
Figure 4:
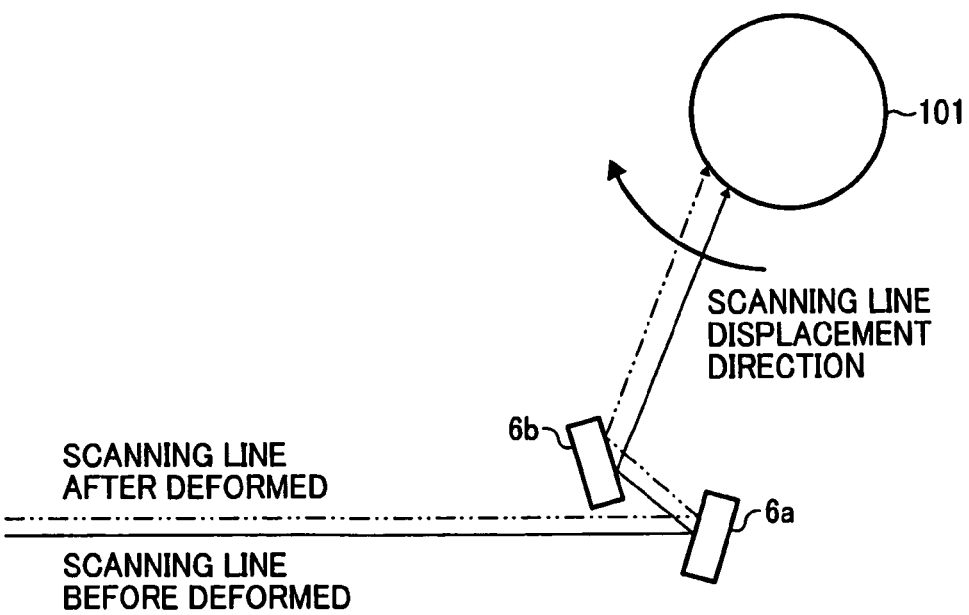
FIG. 4 is a schematic view illustrating a positional deviation of a scanning line in the conventional optical scanning device.

Next, image defects in a conventional optical scanning device are described with reference to FIGS. 3 and 4. When an optical housing is deformed due to heat generated at a polygon scanner 53, a portion on which the polygon scanner as a heat source is arranged (a polygon scanner-arranged surface) is most largely deformed. Then, a surface, on which a face tangle error correction lens 55 is arranged, is pulled by the polygon scanner-arranged surface, so that the posture of the face tangle error correction lens 55 is inclined. An fθ lens 54 is a lens having power in the main-scanning direction, and therefore, a scanning line is not changed in the sub-scanning direction even when the posture of the fθ lens 54 is changed. However, the posture change of the face tangle error correction lens 55 causes a positional deviation of the scanning line in the sub-scanning direction as illustrated by the chain double-dashed line in FIG. 4.

Figure 5:
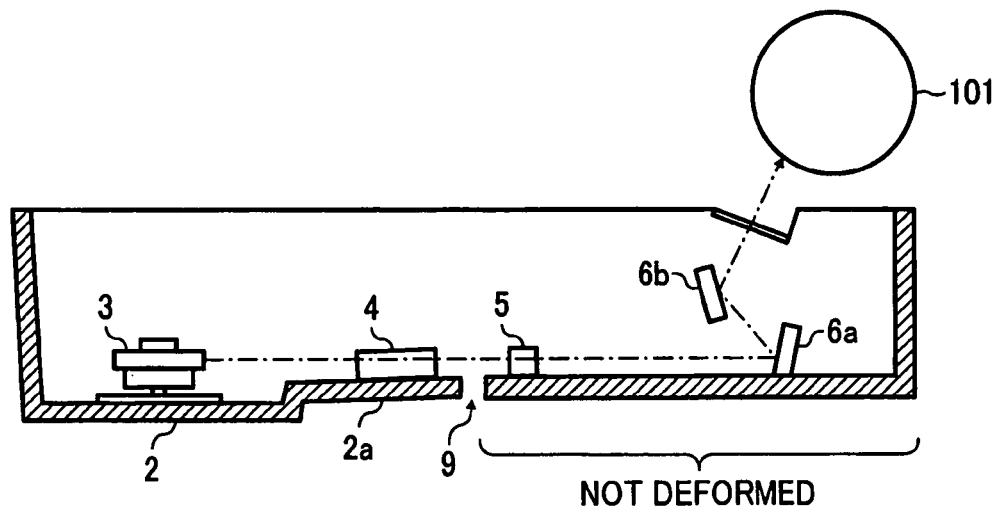
FIG. 5 is a schematic view for explaining an action in the optical scanning device illustrated in FIG. 1.

In order to overcome the problem, in the optical scanning device 10 according to the embodiment, a hole 9 is provided between the polygon scanner 3 and the face tangle error correction lens 5 (at a front side position of the face tangle error correction lens 5 in the sub-scanning direction) on a bottom surface of the optical housing 2 as illustrated in FIG. 1. By providing the hole 9, even when the polygon scanner-arranged surface of the optical housing 2 is thermally deformed, the surface on which the face tangle error correction lens 5 is arranged can be suppressed from being affected by the deformation. That is to say, as schematically illustrated in FIG. 5, even when a housing bottom surface 2a of a portion on which the fθ lens 4 is installed is deformed (warped) because of the thermal deformation of the polygon scanner-arranged surface of the optical housing 2, the deformation is interrupted by the hole 9. Therefore, a surface 2b, on which the face tangle error correction lens 5 is arranged, is not deformed, whereby a positional deviation of a scanning line is prevented.

In recent years, a lens having functions of both an fθ lens and a face tangle error correction lens in combination has been developed. When such a compound lens is used, it is sufficient that the hole 9 is provided between the polygon scanner 3 and this compound lens 11 (at a front side position of the compound lens 11 in the sub-scanning direction) on a bottom surface of the optical housing 2 as in a second embodiment of the invention illustrated in FIG. 6. As the position of the hole 9 is closer to the face tangle error correction lens 5 or the compound lens 11, an effect to be obtained becomes larger.

Figure 7:
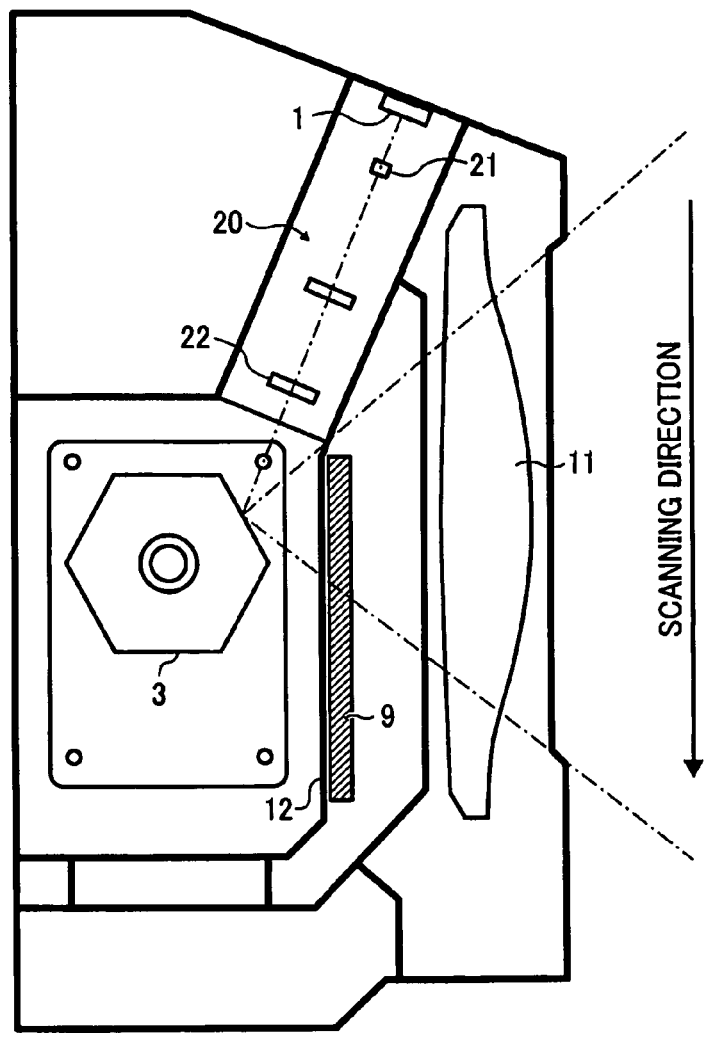
FIG. 7 is a plan view illustrating an optical scanning device according to a reference example.
Figure 8:
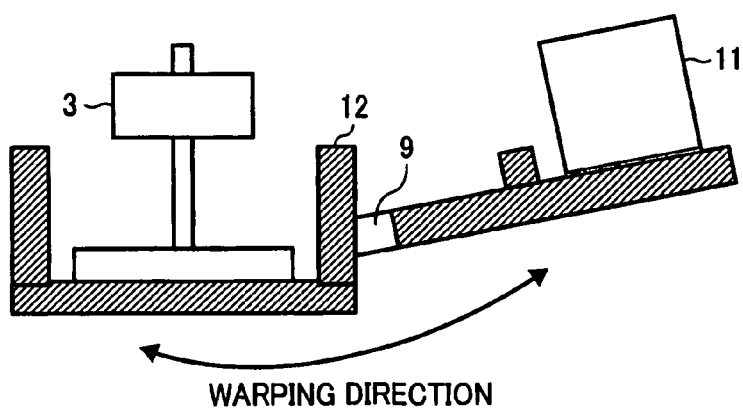
FIG. 8 is a schematic view illustrating warpage of a housing in the optical scanning device according to the reference example.

If the hole 9 is provided near the polygon scanner-arranged surface of the optical housing, in this example, at a position adjacent to a rib 12 arranged near the polygon scanner 3 as illustrated as in FIG. 7, the hole cannot be preferably formed (a required size of the hole cannot be ensured) due to arrangement conditions of various optical elements (including a collimator lens 21 and a cylindrical lens 22) in an incident optical system 20 provided upstream of the polygon scanner. Therefore, if the polygon scanner-arranged surface is thermally deformed, it becomes difficult to suppress warpage of the housing at a portion where the compound lens 11 (or the face tangle error correction lens) is arranged as schematically illustrated in FIG. 8. In addition, the entire of the bottom surface of the optical housing is warped when the thermal deformation occurs as described above. Therefore, it is more effective that the hole 9 is provided near the compound lens (or the face tangle error correction lens) rather than at the center of the housing (at a position near the polygon scanner).

Figure 9:
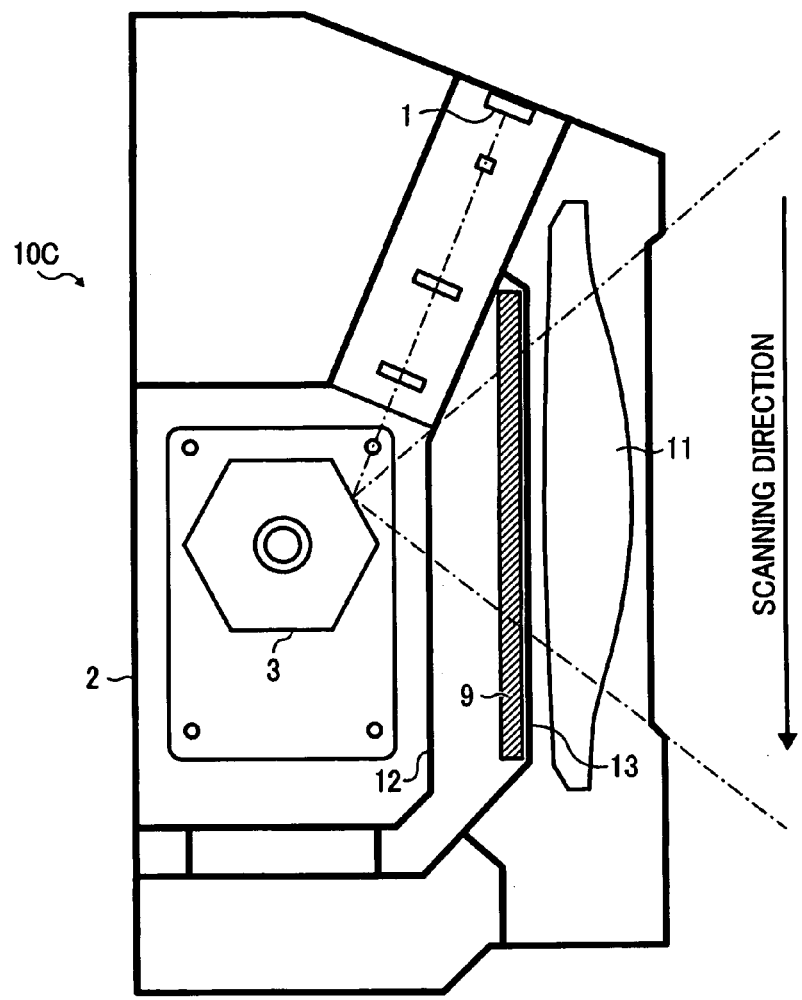
FIG. 9 is a plan view illustrating a third embodiment of the invention using a compound lens 11.
Figure 10:
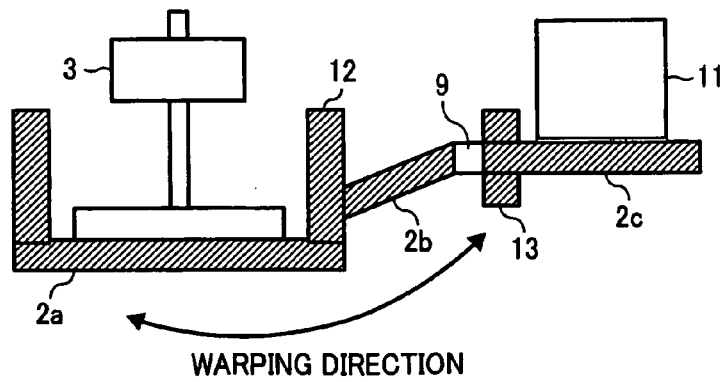
FIG. 10 is a schematic view for explaining an operation in the optical scanning device according to the third embodiment of the invention.

FIG. 9 is a view illustrating a third embodiment of the invention in which the compound lens 11 is used. In FIG. 9, a reinforcement rib 13 is provided near the upstream side (polygon scanner 3 side) of the compound lens 11. The reinforcement rib 13 is a member for reinforcing a bottom surface of the optical housing and is provided in a manner projected in the vertical direction of the bottom surface of the optical housing. Furthermore, the hole 9 is provided along the reinforcement rib 13 so as to be adjacent thereto (upstream of the reinforcement rib 13). The hole 9 can be formed so as to have a sufficient length without being affected by the optical system 20 provided upstream of the polygon scanner, thereby effectively suppressing the influence by the warpage of the bottom surface of the optical housing. That is to say, as schematically illustrated in FIG. 10, even if the warpage of the polygon scanner-arranged surface 2a due to the heat deformation affects the bottom surface 2b on the outer side of the polygon scanner-arranged surface 2a, the influence by the warpage does not extend to a surface 2c on which the compound lens 11 is arranged by being provided of the hole 9. This makes it possible to suppress the compound lens 11 from being inclined. Furthermore, influences (wobble of the compound lens 11 or the like) due to disturbances such as vibration can be suppressed by providing the reinforcement rib 13. Therefore, can be configured an optical housing that is resistant to disturbances such as heat and vibration. An embodiment in which the compound lens is used has been described with reference to FIGS. 9 and 10. However, when the fθ lens 4 and the face tangle error correction lens 5 are used, it is sufficient that the reinforcement rib 13 is provided near the upstream side of the face tangle error correction lens 5 and the hole 9 is provided along the reinforcement rib 13 so as to be adjacent thereto (upstream of the reinforcement rib 13).

Figure 11:
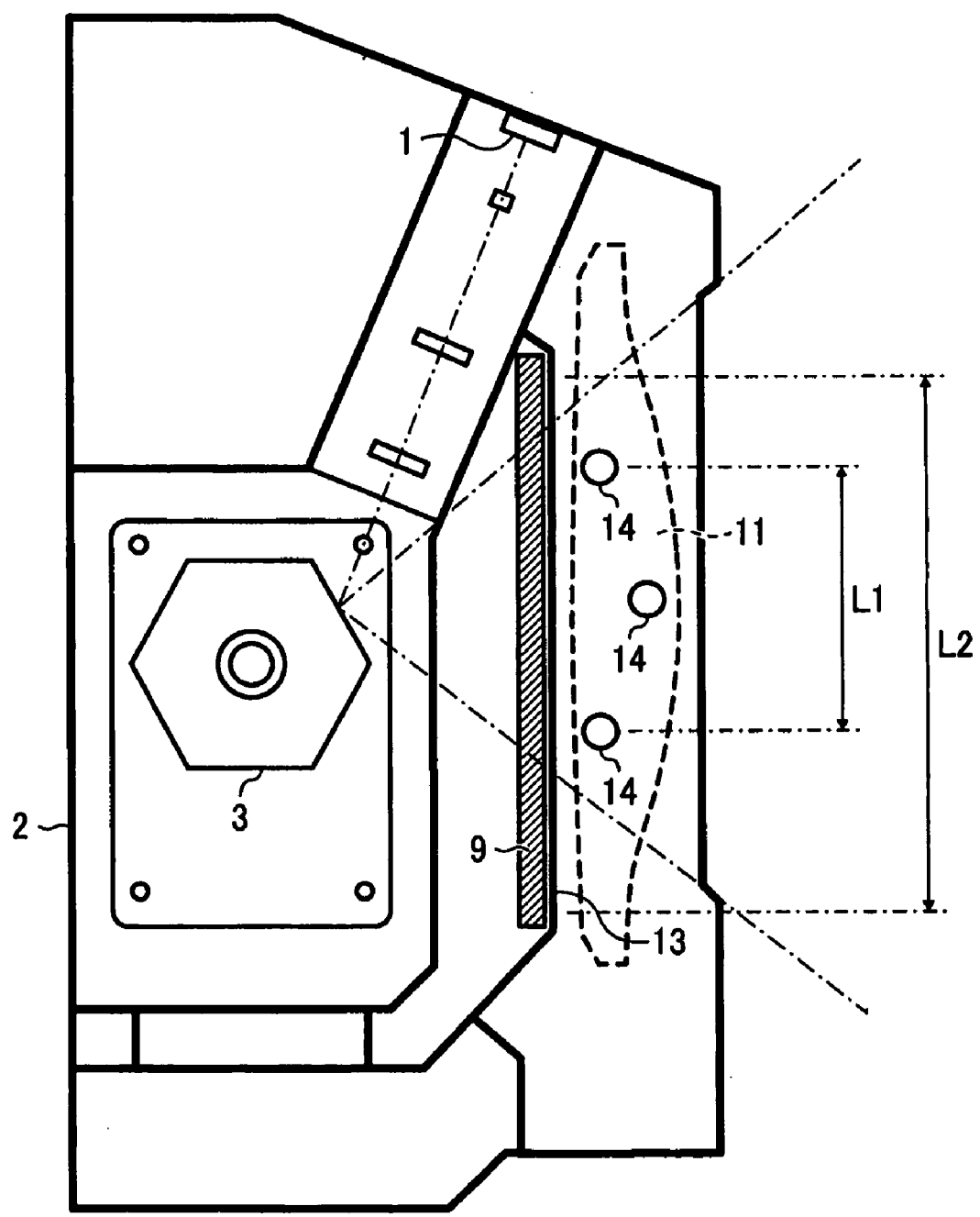
FIG. 11 is a plan view illustrating size of a hole.

The influence by the thermal deformation of the polygon scanner-arranged surface can be effectively suppressed without affecting the surface on which the compound lens 11 (or the face tangle error correction lens 5) is arranged by setting the size of the hole 9 in the following manner. If a distance between bosses 14 located at both ends in the main-scanning direction provided on the bottom surface of the housing is assumed to be L1; and the length of the hole 9 in the main-scanning direction is assumed to be L2 as illustrated in FIG. 11, then a relation of L1<L2 is set. Note that the bosses 14 are provided on the bottom surface of the optical housing in order to place the compound lens 11 (or the face tangle error correction lens 5).

Figure 12:
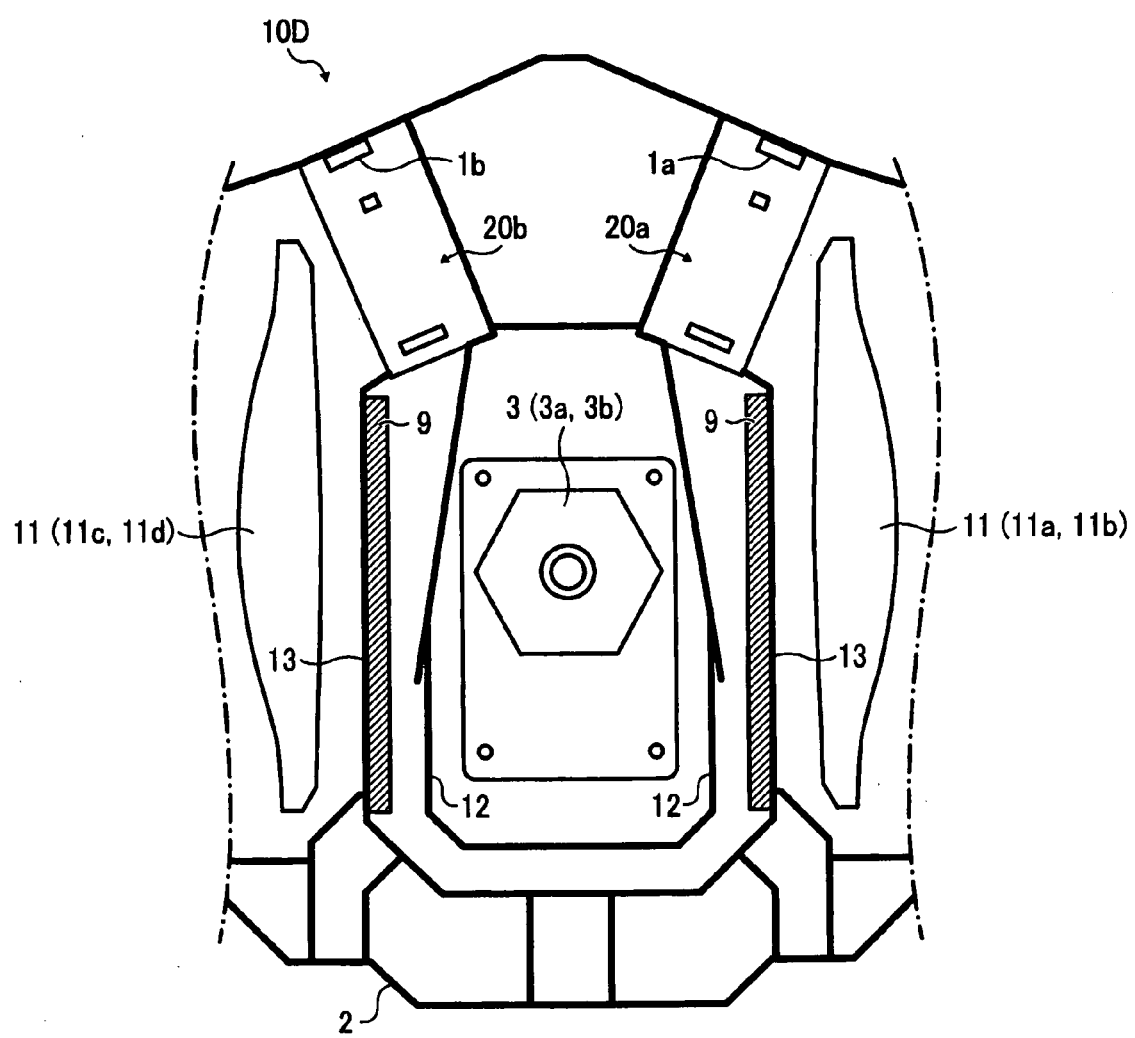
FIG. 12 is a partial plan view illustrating an optical scanning device according to a fourth embodiment of the invention.
Figure 13:
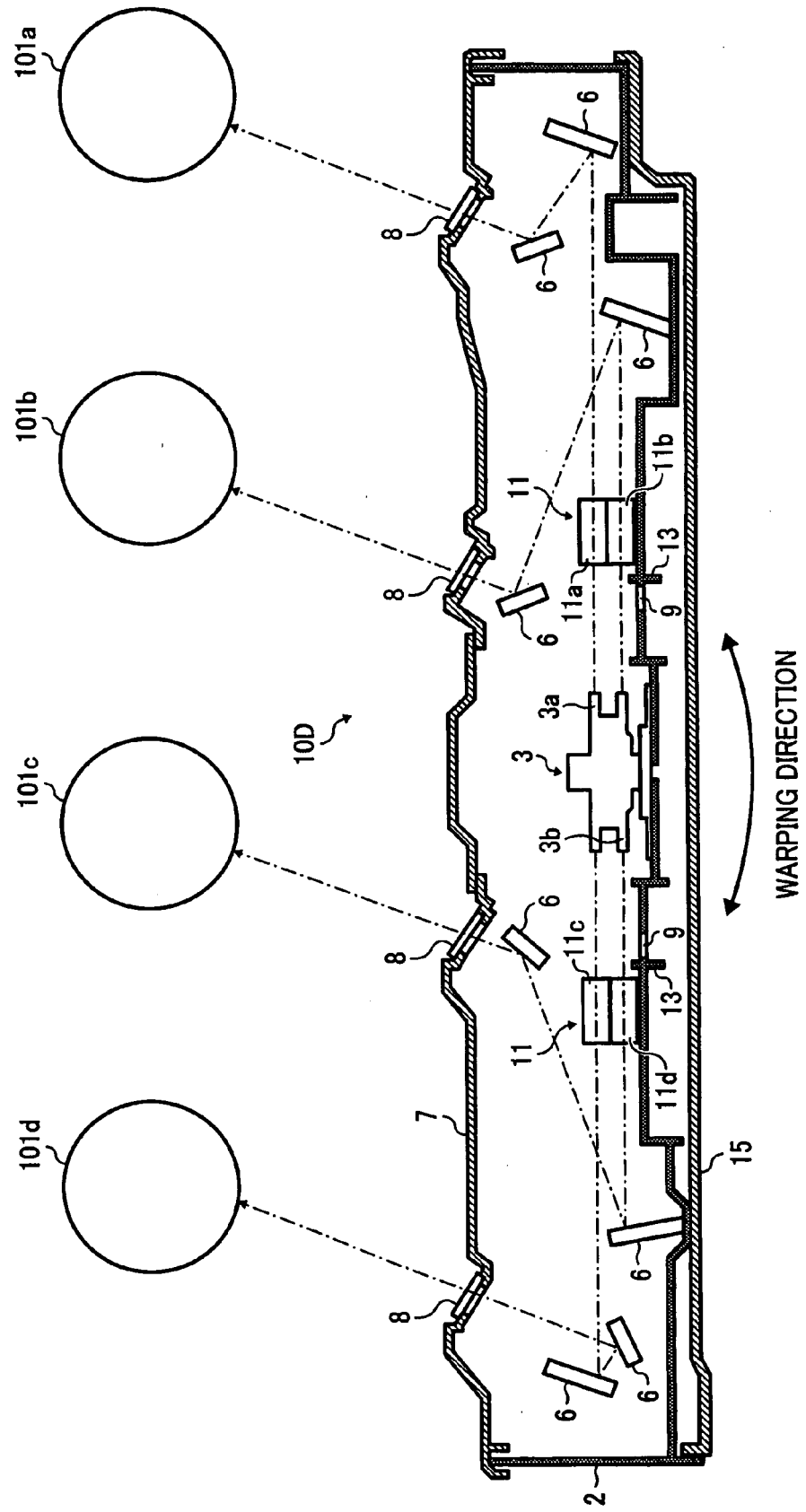
FIG. 13 is a cross-sectional configuration view illustrating the optical scanning device according to the fourth embodiment of the invention.

FIG. 12 is a plan view illustrating an embodiment (fourth embodiment) of an optical scanning device installed on a tandem color machine or the like. FIG. 13 is a cross-sectional view illustrating the embodiment (fourth embodiment) of the optical scanning device. This optical scanning device 10D is of a so-called opposite-placed scanning type and includes two optical systems 20a and 20b upstream of a polygon scanner 3D. Reference numerals 1a and 1b denote light sources that output a laser beam. The polygon scanner 3D according to the embodiment has two reflecting mirrors (rotary polygon mirror) 3a and 3b. Furthermore, compound lenses 11 and 11 are provided on both sides of the polygon scanner 3D, respectively. The compound lenses 11 and 11 include upper and lower, two stages of compound lenses 11a and 11b, and compound lenses 11c and 11d, respectively, such that the compound lenses 11a, 11c correspond to the reflecting mirror (rotary polygon mirror) 3a of the polygon scanner 3D and the compound lenses 11b and 11d correspond to the reflecting mirror 3b of the polygon scanner 3D. Mirrors 6 provided downstream of the compound lenses 11 are also provided so as to correspond to upper and lower, two stages of optical paths. The upper cover 7 is attached to the upper side of the optical housing 2 and a lower cover 15 is attached to the lower side of the optical housing 2 so that the optical housing is sealed. On the upper cover 7, dustproof glasses 8 are fitted into openings for guiding laser beams to image carriers (photosensitive elements) 101a to 101d of an image forming apparatus so as to prevent dusts and the like from being dropped into the optical housing. Note that the image carriers 101a to 101d are targets to be scanned.

Figure 14:
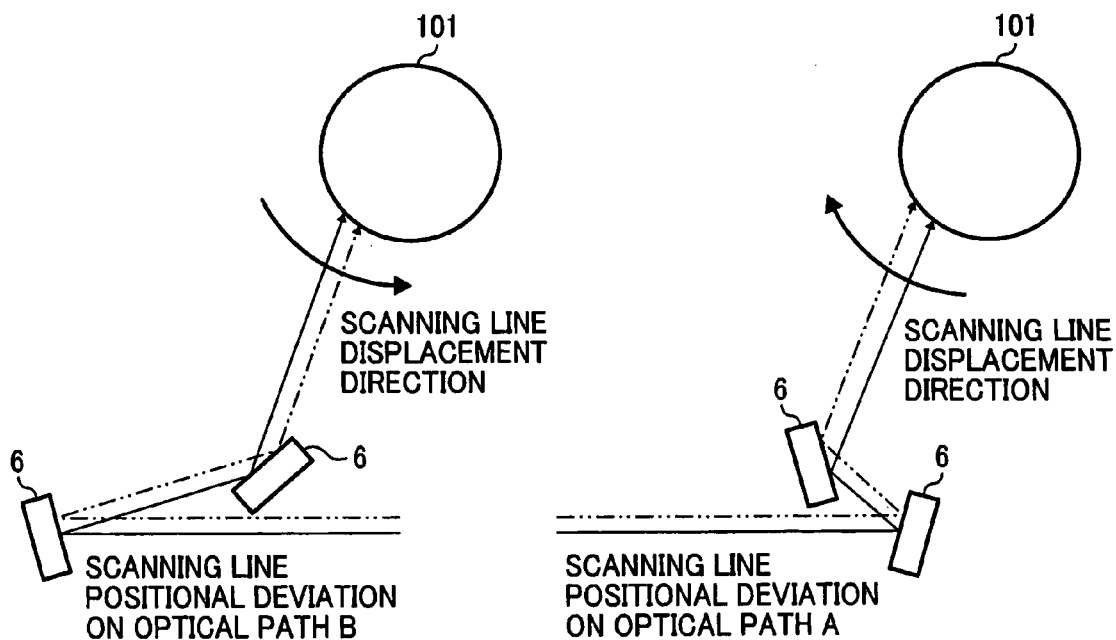
FIG. 14 is a schematic view for explaining a displacement direction of a scanning line in an opposite-placed scanning type optical scanning device.

Thermal deformation of the housing due to heat generated at the polygon scanner in the opposite-placed scanning type optical scanning device causes deformation in a symmetrical pattern as in the arrangement of the optical elements. If an optical path on the right side of the polygon scanner is assumed to be an optical path A and an optical path on the left side of the polygon scanner is assumed to be an optical path B, scanning lines are varied in the opposite directions between the optical path A and the optical path B on the photosensitive elements as illustrated in FIG. 14.

Figure 15:
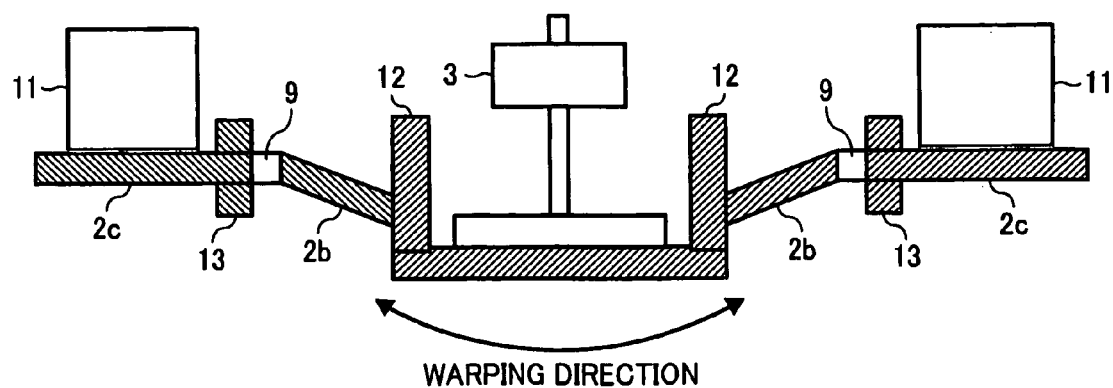
FIG. 15 is a schematic view for explaining an operation in the optical scanning device illustrated in FIG. 12.

Then, in the optical scanning device 10D according to the embodiment, holes 9 and 9 are provided along reinforcement ribs 13 and 13 so as to be adjacent thereto upstream of the reinforcement ribs 13 and 13 (polygon scanner side) as illustrated in FIGS. 12 and 13. Note that the reinforcement ribs 13 and 13 are provided near the upstream sides of the compound lenses 11 and 11. With the holes 9 and 9, as illustrated in FIG. 15, a scanning line variation amount can be reduced without any influence by heat deformation (warpage) of the polygon scanner-arranged surface on arrangement surfaces 2c on which the compound lenses 11 and 11 are arranged. This makes it possible to effectively reduce color shift due to temperature change. The embodiment has been described with the opposite-placed scanning type optical scanning device using the compound lens(es) 11. However, when the fθ lens 4 and the face tangle error correction lens 5 are used, the scanning line variation amount can be reduced in the same manner by providing the reinforcement rib 13 near the upstream side of the face tangle error correction lens 5 and by providing the hole 9 along the reinforcement rib 13 so as to be adjacent thereto (upstream of the reinforcement rib 13).

Figure 16:
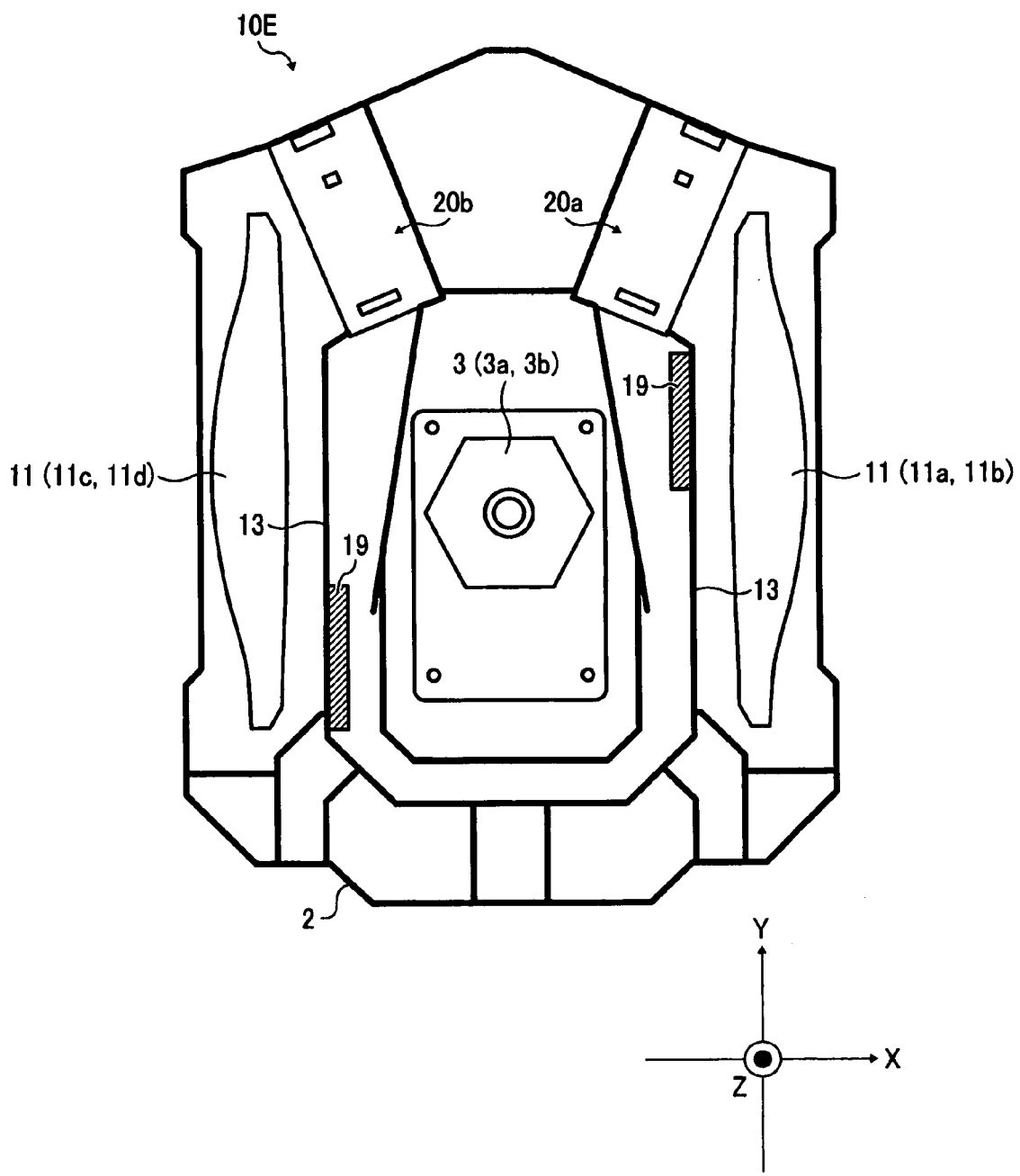
FIG. 16 is a partial plan view illustrating an optical scanning device according to a fifth embodiment of the invention.

FIG. 16 is a plan view illustrating another embodiment (fifth embodiment) of the opposite-placed scanning type optical scanning device.

In this optical scanning device 10E as illustrated in FIG. 16, holes 19 and 19 are provided along the reinforcement ribs 13 and 13 provided near the upstream sides of the compound lenses 11 and 11 so as to be adjacent thereto upstream of the reinforcement ribs 13 and 13 (polygon scanner side). Furthermore, the holes 19 and 19 are arranged at positions that are substantially point-symmetrical about the polygon scanner 3. Configurations other than the holes 19 and 19 are the same as those in the optical scanning device 10D illustrated in FIG. 12, and therefore, overlapped description is omitted.

Figure 17A:
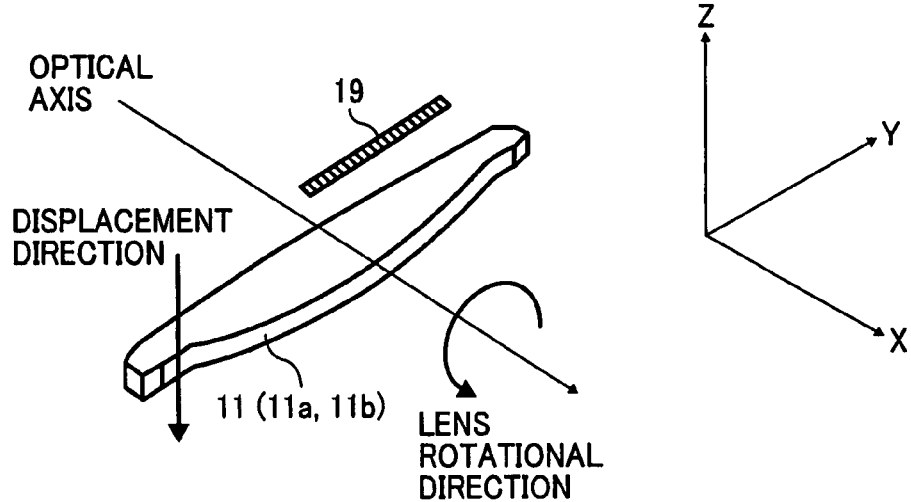
FIGS. 17A and 17B are schematic views for explaining an inclination of a compound lens in the optical scanning device according to the fifth embodiment of the invention.
Figure 17B:
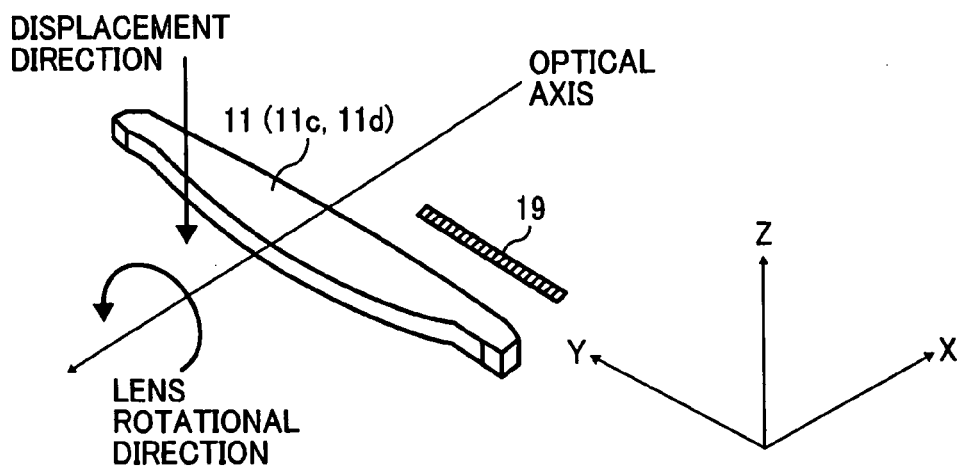

In the configuration where the holes 19 and 19 are arranged at positions that are substantially point-symmetrical about the polygon scanner 3, when heat deformation occurs due to heat generated at the polygon scanner, sides on the bottom surface of the housing (surface on which the compound lenses 11 and 11 are arranged) where the holes 19 and 19 are not provided are pulled by the polygon scanner-arranged surface. Therefore, each compound lens 11 is rotated (inclined) about an optical axis as illustrated in FIGS. 17A and 17B. In the embodiment, the length of each hole 19 is set to be smaller than half of each optical element having power in the sub-scanning direction (the compound lenses 11 and 11 in the embodiment), as is obvious from FIG. 16.

Figure 18A:
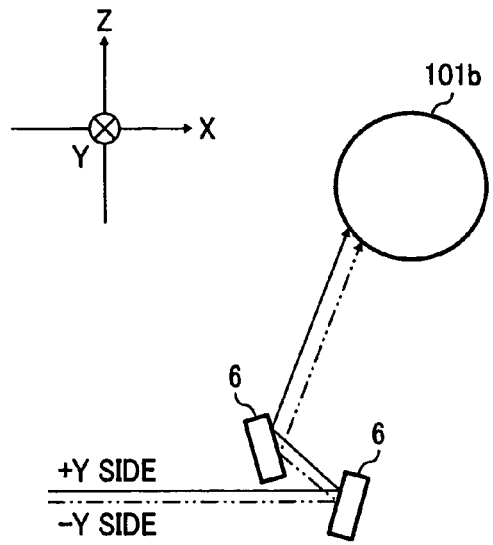
FIGS. 18A and 18B are schematic views illustrating a positional variation of a scanning line on an optical path A side and an optical path B side, respectively.
Figure 18B:
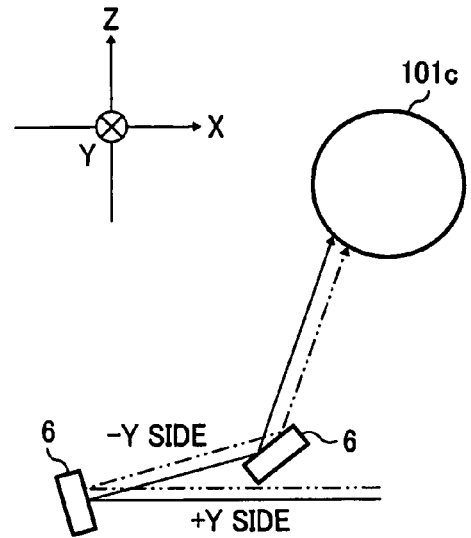
Figure 19:
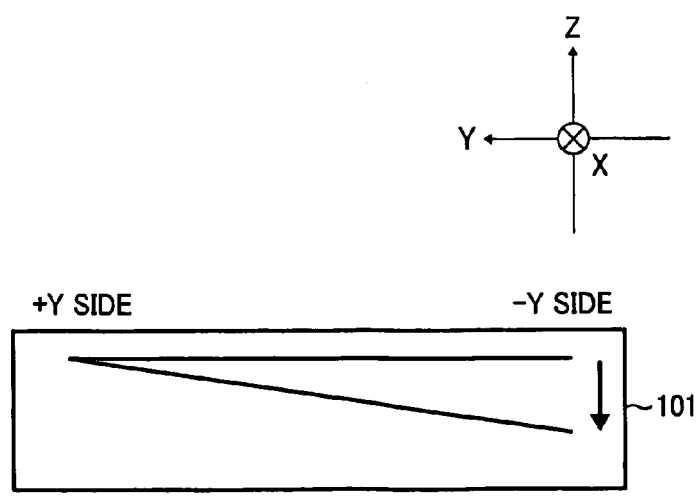
FIG. 19 is a schematic view for explaining displacement of a scanning line on a circumferential surface of a photosensitive element.

FIG. 17A illustrates an inclination (rotation about an optical axis) of the compound lens 11 on the side of the optical path A (right side of the polygon scanner in FIG. 16). FIG. 17B illustrates an inclination of the compound lens 11 on the side of the optical path B (left side of the polygon scanner in FIG. 16). If an upper side and a lower side in FIG. 16 with respect to the optical axis in a Y direction as the main-scanning direction are assumed to be +Y and −Y, respectively, the compound lenses 11 and 11 are displaced in the following manner. The compound lens 11 on the optical path A side as illustrated in FIG. 17A is displaced such that a lens end on the −Y side lowers; and the compound lens 11 on the optical path B side as illustrated in FIG. 17B is displaced such that a lens end on the +Y side lowers. That is to say, inclined (rotational) directions are reverse to each other between the optical path A side and the optical path B side. FIGS. 18A and 18B are schematic views illustrating a positional variation of a scanning line on the optical path A side and the optical path B side, respectively. FIGS. 18A and 18B illustrate states observed from a photosensitive member shaft direction (main-scanning direction). In FIGS. 18A and 18B, the solid lines indicate the position of a scanning line on the −Y side and the chain double-dashed lines indicate the position of a scanning line on the +Y side. It is observed from FIGS. 18A and 18B that the positions of the scanning lines on both of the optical path A side and the optical path B side are varied in the same direction as the rotational directions of the photosensitive elements. That is to say, the scanning lines are displaced on the circumferential surfaces of the photosensitive elements such that inclinations on the optical path A side and the optical path B side are changed in the same directions as illustrated in FIG. 19.

As described above, in the optical scanning device 10E illustrated in FIG. 16, by controlling posture changes of the compound lenses 11 and 11 to be point-symmetrical about the polygon scanner 3 (by being provided with the holes 19 and 19), color shift level on the photosensitive elements can be reduced although the positions of the scanning lines are varied. The embodiment has been described with the opposite-placed scanning type optical scanning device using the compound lenses. However, the same holds true in the configuration in which the fθ lens 4 and the face tangle error correction lens 5 are used.

Figure 20:
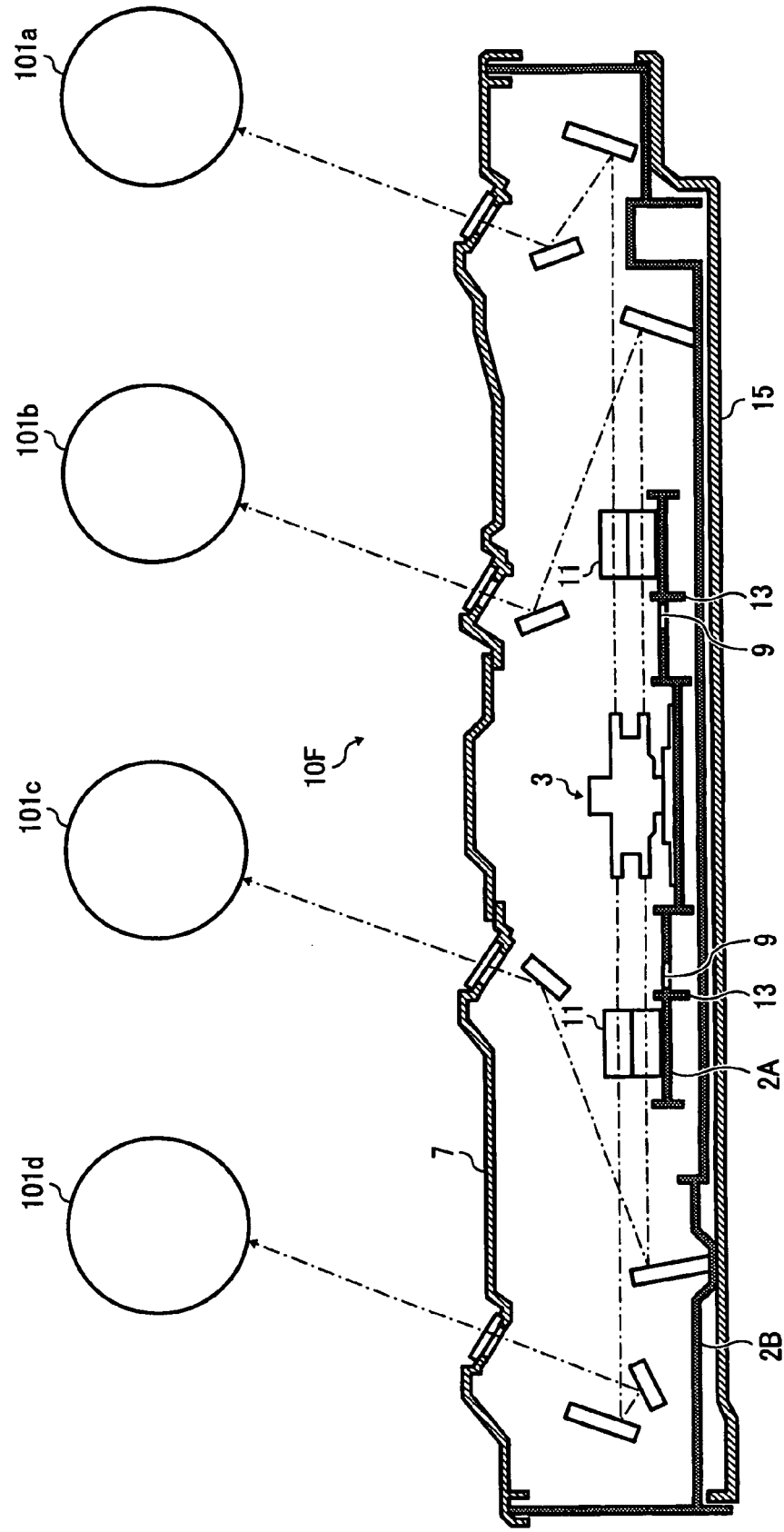
FIG. 20 is a partial plan view illustrating an optical scanning device according to a sixth embodiment of the invention.

FIG. 20 is a plan view illustrating still another embodiment (sixth embodiment) of the opposite-placed scanning type optical scanning device.

Figure 21:
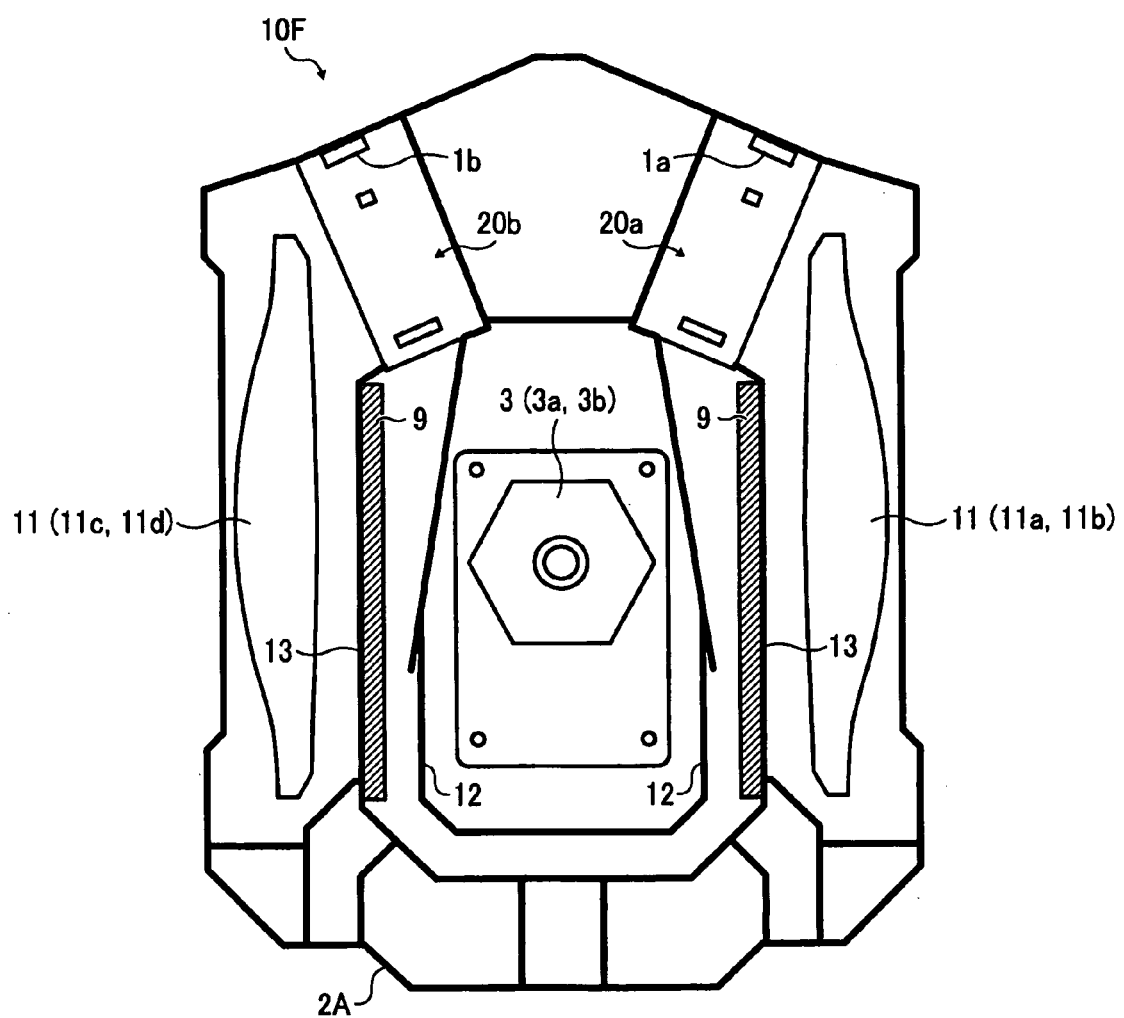
FIG. 21 is a plan view illustrating a first housing portion of the optical scanning device according to the sixth embodiment of the invention.

In this optical scanning device 10F illustrated in FIG. 20, a housing on which optical elements are installed is formed of two housings. That is to say, the optical scanning device 10F has a first housing 2A on which the polygon scanner 3 and the compound lenses 11 and 11 provided on both sides thereof are installed and a second housing 2B on which other optical elements are installed. In the embodiment, the first housing 2A is placed on the second housing 2B. FIG. 21 is a plan view of the first housing 2A.

In the first housing 2A, the holes 9 and 9 are provided along the reinforcement ribs 13 and 13 provided near the upstream sides of the compound lenses 11 and 11 so as to be adjacent thereto upstream of the reinforcement ribs 13 and 13 (polygon scanner side) as in the optical scanning devices according to each embodiment described above. Furthermore, the holes 19 and 19 may be arranged at positions that are substantially point-symmetrical about the polygon scanner 3 as in the optical scanning device 10E illustrated in FIG. 16. Accordingly, the effect of reducing color shift due to temperature change can be obtained.

The embodiment has been described with the opposite-placed scanning type optical scanning device using the compound lenses. However, the housing can be also formed of two housings in the same manner with a configuration in which the fθ lens 4 and the face tangle error correction lens 5 are used. For example, the polygon scanner 3, the fθ lens 4, and the face tangle error correction lens 5 can be installed on the first housing 2A.

In the optical scanning device 10F according to the embodiment, when an optical scanning device in accordance with the size or the configuration of an image forming apparatus is configured, the optical scanning device can be easily made compatible with an image forming apparatus having different sizes and different configurations by changing the configuration of the second housing 2B while commonly configuring the first housing 2A (and optical elements installed thereon). This makes it possible to largely shorten developing procedures of the optical scanning device and largely reduce developing cost thereof. Furthermore, cost of parts can be largely reduced; because the first housing 2A can be used in common among other machine models. In addition, with such configuration, even when the hole 9 or hole 19 is provided on the first housing 2A, the housing can be sealed by the second housing 2B. Therefore, a dust-proof effect can be obtained so as to obtain the effect of reducing defective images generated due to entry of dusts and the like over time.

Figure 22:
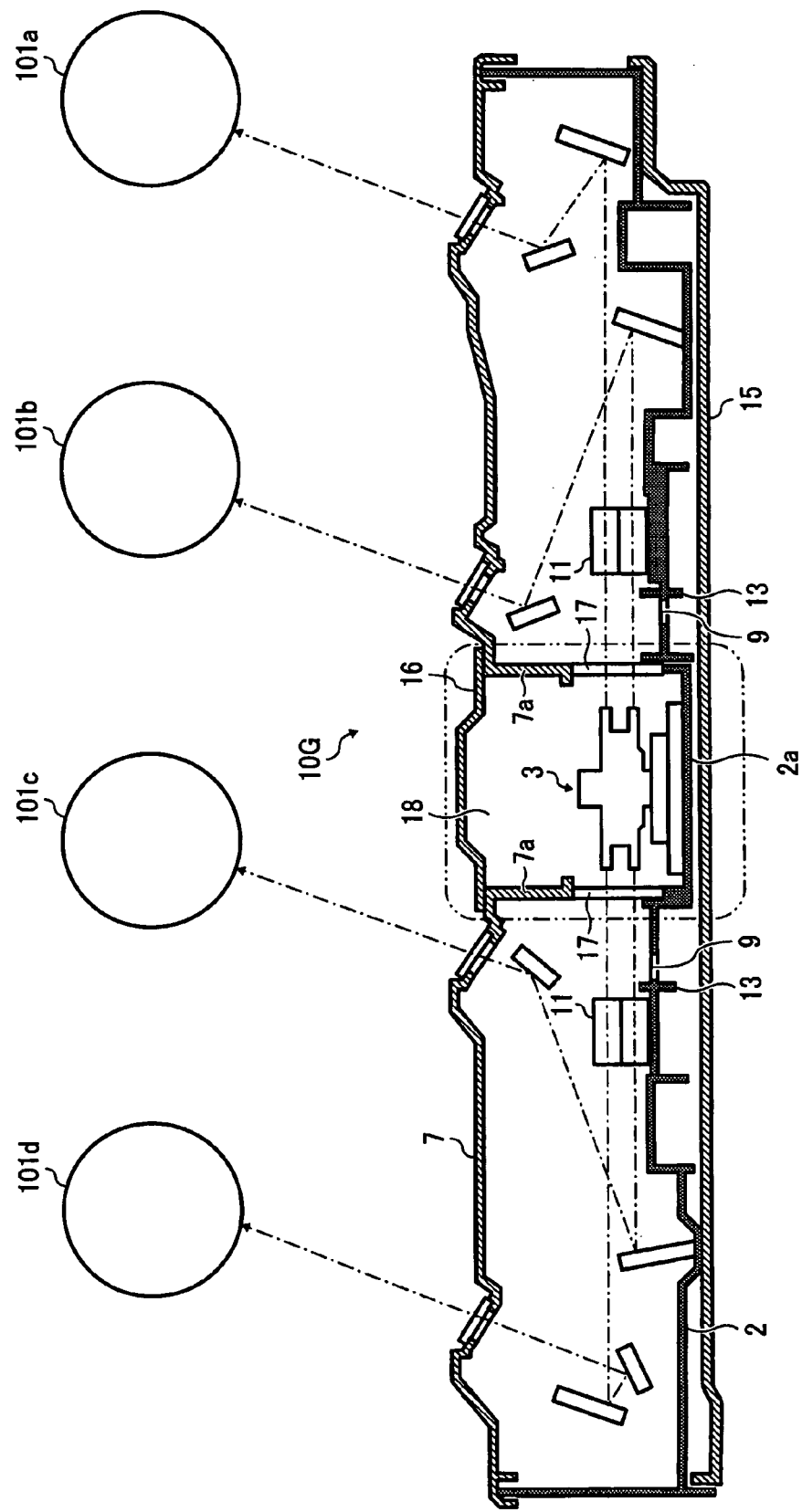
FIG. 22 is a partial plan view illustrating an optical scanning device according to a seventh embodiment of the invention.

FIG. 22 is a plan view illustrating still another embodiment (seventh embodiment) of the opposite-placed scanning type optical scanning device.

In this optical scanning device 10G illustrated in FIG. 22, a polygon scanner accommodating portion is configured as a sealed structure. Other basic configurations are the same as those in the optical scanning device 10 illustrated in FIG. 13, and therefore, overlapping description is omitted.

As illustrated in FIG. 22, a portion, where the polygon scanner 3 is accommodated (a portion surrounded by the chain double-dashed line in FIG. 22), is configured as a sealed space by a polygon scanner-arranged surface 2a of the optical housing 2, bent-down portions 7a and 7a that are a part of the upper cover 7, a polygon scanner accommodation cover 16, soundproof glasses 17 and 17, and housing side walls 18 (only a side wall 18 on the rear side is illustrated and another side wall on the front side is not illustrated in FIG. 22, which is a cross-sectional view). Scanning light beams deflected by the polygon scanner 3 are output to the outside of the polygon scanner accommodating portion through the soundproof glasses 17 and 17 as transparent members, so as finally to be guided to the photosensitive elements 101.

It has been known that when the polygon scanner is continuously operated in an opened state, minute objects in the air are attached to a portion of the polygon mirror surface due to a negative pressure to deteriorate a reflection rate on the mirror surface. Furthermore, it has been also known that when the polygon scanner is operated in the optical scanning device, heat distribution is caused on optical elements near the polygon scanner in a scanning direction due to rotating airflow generated by the polygon scanner. As a solution to these problems, a technique of using the polygon scanner in a sealing manner has been known. However, color shift level is significantly deteriorated because heat is locally generated in the optical housing by sealing the polygon scanner. In order to solve the problem, in the embodiment, the polygon scanner accommodating portion is sealed instead of sealing the polygon scanner. As a result, color-shifted images due to heat generation of the polygon scanner are reduced and defective images due to fog of the polygon scanner are reduced.

Figure 6:
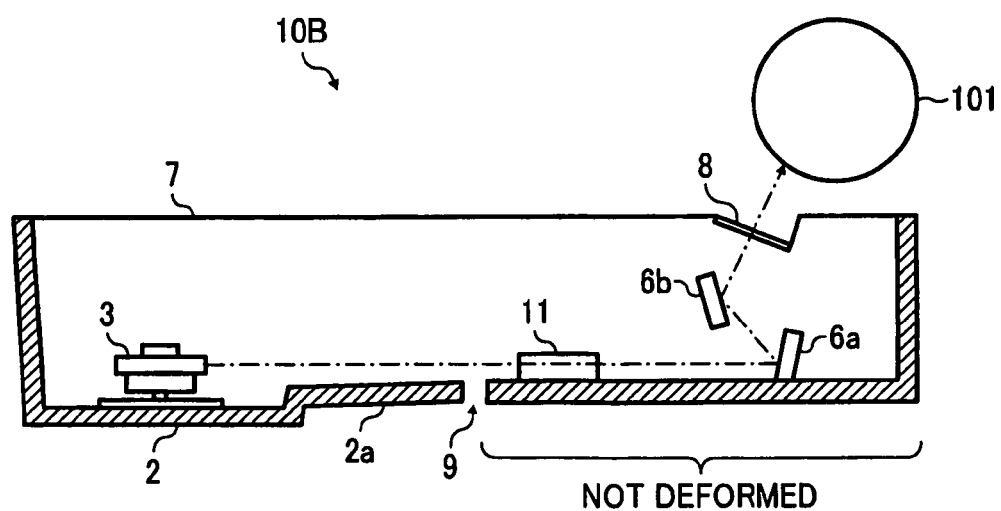
FIG. 6 is a schematic view for explaining an operation in a second embodiment of the invention.

The embodiment has been described on the opposite-placed scanning type optical scanning device. However, an embodiment in which an optical element is arranged on one side of the polygon scanner as illustrated in FIGS. 1, 6, and 9 can also provide the same effects by making the polygon scanner accommodating portion be provided with a sealed structure.

Figure 23A:
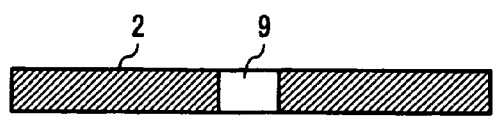
FIG. 23A is a cross-sectional view illustrating a hole that is provided on a bottom surface of a housing.

In each of the above embodiments, a configuration, in which the hole 9 (or hole 19) is provided on the optical housing 2 as illustrated in FIG. 23A, has been described as a configuration by which influence by heat deformation generated in the polygon scanner-arranged surface of the optical housing is suppressed (warpage of the bottom surface of the housing due to heat deformation is suppressed from being propagated to the surface on which the face tangle error correction lens 5 or the compound lens 11 is arranged). In this case, another part for closing the hole is required in some cases in order to keep dusts and the like out depending on apparatus configurations.

Figure 23B:
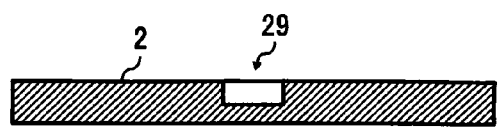
FIG. 23B is a cross-sectional view illustrating a thin-walled portion that is provided on a bottom surface of a housing.

Then, a configuration including a thin-walled portion 29 formed by making the thickness of a part of the bottom surface of the housing small may be employed as illustrated in FIG. 23B. By providing the thin-walled portion 29 that does not penetrate through the housing, realized can be an optical housing having a dust-proof property while suppressing influence by the heat deformation. Therefore, level of color-shifted images due to heat generation can be reduced while suppressing defective images due to entry of dusts and the like.

Figure 24:
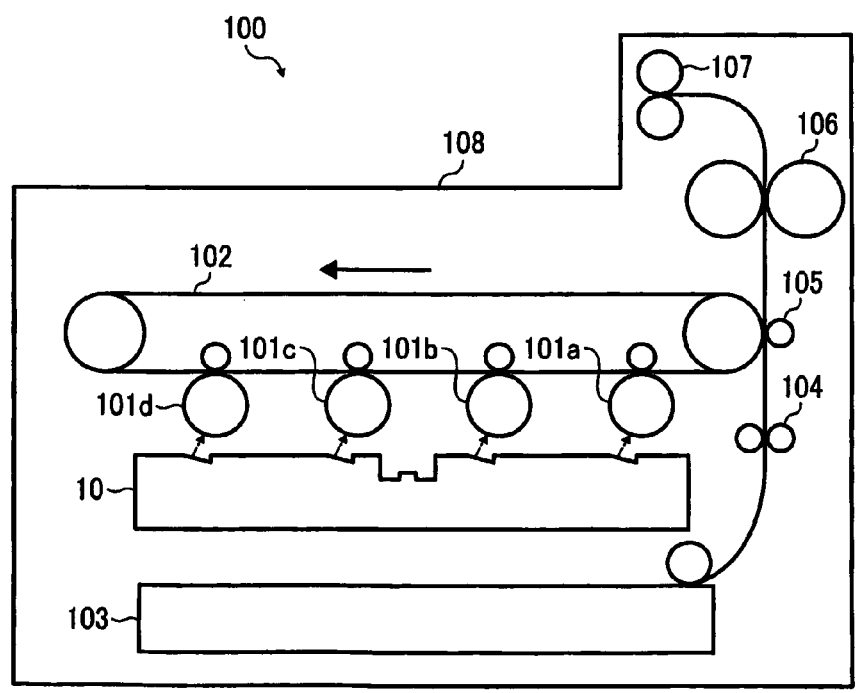
FIG. 24 is a cross-sectional configuration view illustrating an example of an image forming apparatus according to the invention.

Finally, an example of an image forming apparatus on which the optical scanning device according to the invention is installed is described. A full-color printer 100 illustrated in FIG. 24 is a so-called four-series tandem type image forming apparatus. In the full-color printer 100, four image forming units (for four colors) are arranged so as to be opposed to the intermediate transfer belt 102 and a toner image on each photosensitive element 101 is transferred onto the intermediate transfer belt 102 in a superimposed manner. Then, toner images are collectively transferred from the intermediate transfer belt 102 onto a recording material fed from a paper feeding unit 103, so that a full color image can be obtained in a short time.

As illustrated by the arrow in FIG. 24, the intermediate transfer belt 102 is rotationally moved counterclockwise. The four image forming units (for four colors) mainly including the photosensitive elements 101 are arranged in parallel under the intermediate transfer belt 102. The image forming units for four colors have the same configuration and only colors of toners to be used are different from each other. In this example, an image is formed by the respective color image forming units by using the following colors of toner: cyan, magenta, yellow, and black. The optical scanning device 10 is arranged under the image forming units. As the optical scanning device 10, the opposite-placed scanning type optical scanning device can be employed among the optical scanning devices according to the above-described embodiments. A recording material fed from the paper feeding unit 103 is fed out by registration rollers 104 at such a timing that a toner image on the intermediate transfer belt 102 is preferably transferred onto the recording material. Then, the toner image on the intermediate transfer belt 102 is transferred onto the recording material by an action of a transfer roller 105 as a transfer unit. The toner image transferred onto the recording material is fixed by fixing units 106; and the recording material is discharged by ejecting rollers 107 onto a discharge tray 108 so as to be stacked.

The invention has been described by examples as illustrated in the drawings. However, the invention is not limited thereto. For example, the shape of the optical housing and the shape and the size of the hole provided on a lens-arranged surface can be appropriately set. Furthermore, types or the number of optical elements arranged in the optical scanning device can be optionally set. In addition, a refracting path of scanning light can be appropriately set.

Furthermore, the configuration of the image forming units is optional in the image forming apparatus and process cartridges for respective colors in the tandem type image forming apparatus may be arranged in an optional order. The invention can be applied to a full color machine using three colors of toners, a multicolor machine using two colors of toners, or a monochrome machine. The image forming apparatus is not limited to a printer and a copying machine, a facsimile, or an MFP having a plurality of functions may be employed.

With an optical scanning device and an image forming apparatus according to an aspect of the invention, even if a polygon-arranged surface of the optical housing is deformed (warped) due to heat generation of the polygon scanner, the deformation is interrupted by the hole or the thin-walled portion. Therefore, a surface on which an optical element having power in the sub-scanning direction is arranged is not deformed so as to prevent a positional deviation of a scanning line. Accordingly, defective images such as color-shifted images due to temperature change can be suppressed with simple configuration at low cost.

With a configuration according to a second aspect of the invention, the effect of enhancing rigidity of the optical housing can be obtained so as to reduce defective images due to disturbances such as heat generation and vibration.

With a configuration according to a third aspect of the invention, a posture change of the optical element having power in the sub-scanning direction can be reduced so as to reduce level of defective images due to heat generation of the polygon scanner.

With a configuration according to a fourth aspect of the invention, even if thermal deformation of a housing occurs on each side of the polygon scanner in a symmetrical manner in an opposite-placed scanning type optical scanning device, level of color-shifted images due to heat generation can be reduced.

With a configuration according to a fifth aspect of the invention, level of color-shifted images due to heat generation in an optical scanning device compatible with full color image formation can be reduced.

With a configuration according to a sixth aspect of the invention, even when heat deformation of the housing occurs such that an optical element is rotationally varied with respect to an optical axis on each side of the polygon scanner in an opposite-placed scanning type optical scanning device, positions of scanning lines are varied in the same direction on surfaces to be scanned, whereby level of color-shifted images due to heat generation can be reduced.

With a configuration according to a seventh aspect of the invention, deterioration in rigidity of a bottom surface of the housing due to the provision of the hole can be suppressed as much as possible.

With a configuration according to an eighth aspect of the invention, when an optical scanning device in accordance with the size or the configuration of an image forming apparatus is configured, the optical scanning device can be easily made compatible with an image forming apparatus having different sizes and different configurations by changing the configuration of the second housing while commonly configuring the first housing (and optical elements installed thereon). This makes it possible to largely shorten developing procedures of the optical scanning device and largely reduce developing cost thereof. Furthermore, cost of parts can be largely reduced because the first housing can be used in common among other machine models. In addition, with such configuration, even when the hole is provided on the first housing, the housing can be sealed by the second housing. Therefore, a dust-proof effect can be obtained so as to obtain the effect of reducing defective images due to entry of dusts and the like over time.

With a configuration according to a ninth aspect of the invention, the polygon scanner accommodating portion is sealed instead of sealing the polygon scanner. This makes it possible to prevent level of color shift from being deteriorated without causing heat distribution on optical elements near the polygon scanner in the scanning direction. Therefore, color-shifted images due to heat generation can be reduced; and defective images due to fog of the polygon scanner are reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source;
   a polygon scanner that deflects a light beam output from the light source; and
   various types of optical elements for focusing the light beam deflected by the polygon scanner onto a desired position on a surface to be scanned, wherein
   a hole or a thin-walled portion that is provided on an arrangement surface of an optical housing on which the polygon scanner and an optical element having power in a sub-scanning direction are arranged, wherein
   the hole or a thin-walled portion
      extends along a main-scanning direction, and
      is provided near to the optical element having power in the sub-scanning direction between the polygon scanner and the optical element having power in the sub-scanning direction.

2. The optical scanning device according to claim 1, further comprising:
   a reinforcement rib that
      protrudes from the arrangement surface of the optical housing, and
      is provided near an upstream side of the optical element having power in the sub-scanning direction, wherein
   the hole or the thin-walled portion is provided along the reinforcement rib near the upstream side of the reinforcement rib.

3. The optical scanning device according to claim 1, wherein
   a size of the hole or the thin-walled portion in the main-scanning direction is larger than a distance between both ends of a supporting portion in the main-scanning direction, the supporting portion being provided on the arrangement surface of the optical housing so as to support the optical element having power in the sub-scanning direction.

4. The optical scanning device according to claim 1, wherein
   the polygon scanner is provided as a common single deflector, and
   the various types of optical elements are provided on both sides of the polygon scanner in a substantially symmetrical manner so that a plurality of surfaces to be scanned are scanned.

5. The optical scanning device according to claim 4, wherein
   the polygon scanner having two stages of rotary polygon mirrors is provided so as to scan four surfaces to be scanned.

6. The optical scanning device according to claim 4, wherein
   the holes or the thin-walled portions that are provided on both sides of the polygon scanner are arranged substantially point-symmetrical about the polygon scanner.

7. The optical scanning device according to claim 6, wherein
   a size of each of the holes or the thin-walled portions in the main-scanning direction is smaller than a size of half of each optical element having power in the sub-scanning direction in the main-scanning direction.

8. The optical scanning device according to claim 1, further comprising:
   a first optical housing on which at least the polygon scanner and the optical element having power in the sub-scanning direction are installed; and
   a second optical housing on which the first optical housing and other optical elements are installed.

9. The optical scanning device according to claim 1, wherein
   an accommodating portion for the polygon scanner of the optical scanning device is configured as a sealed structure.

10. An image forming apparatus comprising the optical scanning device according to claim 1.

* * * * *